United States Patent
Suzuki et al.

[11] Patent Number: 5,909,966
[45] Date of Patent: Jun. 8, 1999

[54] SELF-ACTING AIR BEARING

[75] Inventors: Mitsuo Suzuki; Yukio Itami, both of Kanagawa; Kyousuke Ono, Tokyo, all of Japan

[73] Assignee: Ricoh Company, Ltd., Tokyo, Japan

[21] Appl. No.: 08/954,060

[22] Filed: Oct. 20, 1997

Related U.S. Application Data

[63] Continuation of application No. 08/575,889, Dec. 20, 1995, abandoned.

[51] Int. Cl.$^6$ .................................................... F16C 32/06
[52] U.S. Cl. ............................................................ 384/115
[58] Field of Search ........................... 384/100, 114, 384/115, 118

[56] References Cited

U.S. PATENT DOCUMENTS

| | | | |
|---|---|---|---|
| 3,601,459 | 8/1971 | Cutting | 384/100 |
| 4,222,617 | 9/1980 | Romberg | 384/100 X |
| 5,069,515 | 12/1991 | Itami et al. | 359/200 |
| 5,181,783 | 1/1993 | Sherman et al. | 384/100 X |

FOREIGN PATENT DOCUMENTS

| | | | |
|---|---|---|---|
| 89807 | 3/1990 | Japan | 384/114 |
| 94/28323 | 12/1994 | WIPO | 384/114 |

*Primary Examiner*—Thomas R. Hannon
*Attorney, Agent, or Firm*—Oblon, Spivak, McClelland, Maier & Neustadt, P.C.

[57] ABSTRACT

A self-acting air bearing includes a housing, a shaft member supported in the housing, a cylindrical member which is installed around the shaft member coaxially and rotatably, and which rotates and generates a dynamic air pressure and thereby the cylindrical member is floatingly supported from the shaft member. In the bearing, concavities and convexes are formed at a same interval in a peripheral direction in either an outer peripheral surface of the shaft member or an inner peripheral surface of the cylindrical member, and a wave of one cycle between a beginning position of the concavity and an ending position of the convex is a harmonic wave. A bearing with high stability at high speed and high accuracy and which has high stability at high speed and low unbalance vibration can be achieved.

7 Claims, 4 Drawing Sheets

SELF-ACTING AIR BEARING

This application is a Continuation of application Ser. No. 08/575,889, filed on Dec. 20, 1995, now abandoned.

BACKGROUND OF THE INVENTION

1. Field of the Invention

The present invention relates to a self-acting air bearing and process of producing the same, and more particularly to a self-acting air bearing and process of producing the same employed in a laser scanner of a laser printer, a digital copying machine, a laser facsimile machine, etc.

2. Discussion of the Background

Generally, though a small size rotor is supported by an antifriction bearing, if the rotating speed becomes 10,000 rpm or more, problems of vibration, noise and life of a lubricating oil occur. Therefore an air bearing is often employed as a bearing at high speeds of 10,000 rpm or more for high accuracy.

As a self-acting air bearing which generates a pressure for supporting its self-weight by rotation of a rotor, a cylindrical bearing, Tilting-Pad bearing or grooved-journal air bearing is conventionally employed.

A cylindrical bearing is easy to produce or work. When the cylindrical bearing supports a horizontal rotor, an eccentric force is acted by its self-weight. Therefore if a bearing spacing is narrower, since the cylindrical bearing can support stably up to approximately 15,000 rpm, it was employed for supporting a rotor in a broadcasting VTR in some cases. However when it supports a vertical rotor, as whirl instability occurs from low speed, it cannot be employed.

Further, in a Tilting-Pad bearing, a bearing surface is divided into three or four arcs of pads and the pads are softly supported whereby stability of a rotor at high speed is provided. Therefore it is employed in a turbo expansion apparatus for liquid helium. However, since there are problems in that the accuracy of the bearing is low and producing the bearing is complicated, it is not suitable as an air bearing for consumer use or office use which requires high accuracy rotation and low cost.

There is a grooved-journal air bearing for solving the above problems, such as one with herringbone spiral grooves. In this bearing, spiral grooves are formed for involving an air from outside by rotation. Even if the bearing does not have eccentricity, a bearing reaction force is generated in a radius direction by these spiral grooves. Therefore even in a vertical rotor, the bearing can support stably up to high speed which is ten thousand rpm or more of revolution. In this case, etching, rolling or laser working etc. is employed for forming those grooves.

Moreover, a multilobe bearing which is stable up to high speed is employed as liquid bearing in a turbo apparatus, which is not employed as the air bearing. In the multilobe bearing, the cylindrical bearing is divided into two or three arcs and each arc is set closer than the position in cylindrical bearing. A large eccentricity is provided to the bearing in each arc portion thereby the whirl stability can be increased. However, as the bearing is divided, it is not easy to produce or work with high accuracy of $\mu$m or less and an area where air pressure generated is small. Therefore it is not employed in an air bearing which requires minute bearing spacing of $\mu$m.

From the above reasons, the grooved-journal bearing is often employed as a self-acting air bearing in the laser scanner wherein a vertical rotor is often employed.

However, in the conventional grooved-journal bearing, as the groove is formed by etching, rolling or laser working, etc., manhours for producing or working the bearing is increased and therefore a problem of high production cost occurs. Further, in the conventional grooved-journal bearing, though the rotation is stable, there is a problem that dynamic rigidity with respect to an unbalance vibration of a rotor is lower than in the cylindrical bearing.

SUMMARY AND OBJECT OF THE INVENTION

Accordingly, one object of the present invention is to provide for a self-acting air bearing with high speed and high accuracy which has stability at high speed and low unbalance vibration.

Another object of the present invention is to provide for a process of producing a self-acting air bearing with high speed and high accuracy whereby low production cost and high productivity can be achieved.

These and other objects and advantages are achieved by the present invention which provides for a self-acting air bearing which includes a housing, a shaft member supported in the housing, a cylindrical member which is installed around the shaft member coaxially and rotatively, and which rotates and generates a dynamic air pressure and thereby the cylindrical member is floatingly supported from the shaft member, wherein concavities and convexes are formed at a same interval in a peripheral direction in either an outer peripheral surface of the shaft member or an inner peripheral surface of the cylindrical member, and a wave of one cycle between a beginning position of the concavity and an ending position of the convex is a harmonic wave. A bearing with high stability at high speed and high accuracy which has high stability at high speed and low unbalance vibration can be achieved.

The present invention also relates to a process for producing a self-acting air bearing which comprises the steps of forming a shaft member; installing a cylindrical member around the shaft member coaxially and rotatably, locating pressing members at a same interval around either an outer peripheral surface of the shaft member or an inner peripheral surface of the cylindrical member; and pressing the pressing members against either of the surfaces so that concavities and convexes are formed in either of the surfaces.

In the process of the present invention, the concavities and convexes can also be formed by extrusion molding into which either the shaft member or the cylindrical member is inserted and pressed into a mold wherein the concavities and convexes are formed. Also, the concavities and convexes can be formed by injection molding into which a resin is injected into a mold wherein the concavities and convexes are formed and the concavities and convexes are transferred to the resin.

BRIEF DESCRIPTION OF THE DRAWINGS

In describing the preferred embodiments of the present invention illustrated in the drawings, specified terminology is employed for the sake of clarity. However, the invention is not intended to be limited to the specific terminology so selected, and it is to be understood that each specific element includes all technical equivalents which operate in a similar purpose.

A more complete appreciation of the present invention and many of the attendant advantages thereof will be readily obtained as the same becomes better understood by reference to the following detailed description, particularly when considered in connection with the accompanying drawings, wherein.

DESCRIPTION OF THE PREFERRED EMBODIMENTS

Figure 1:
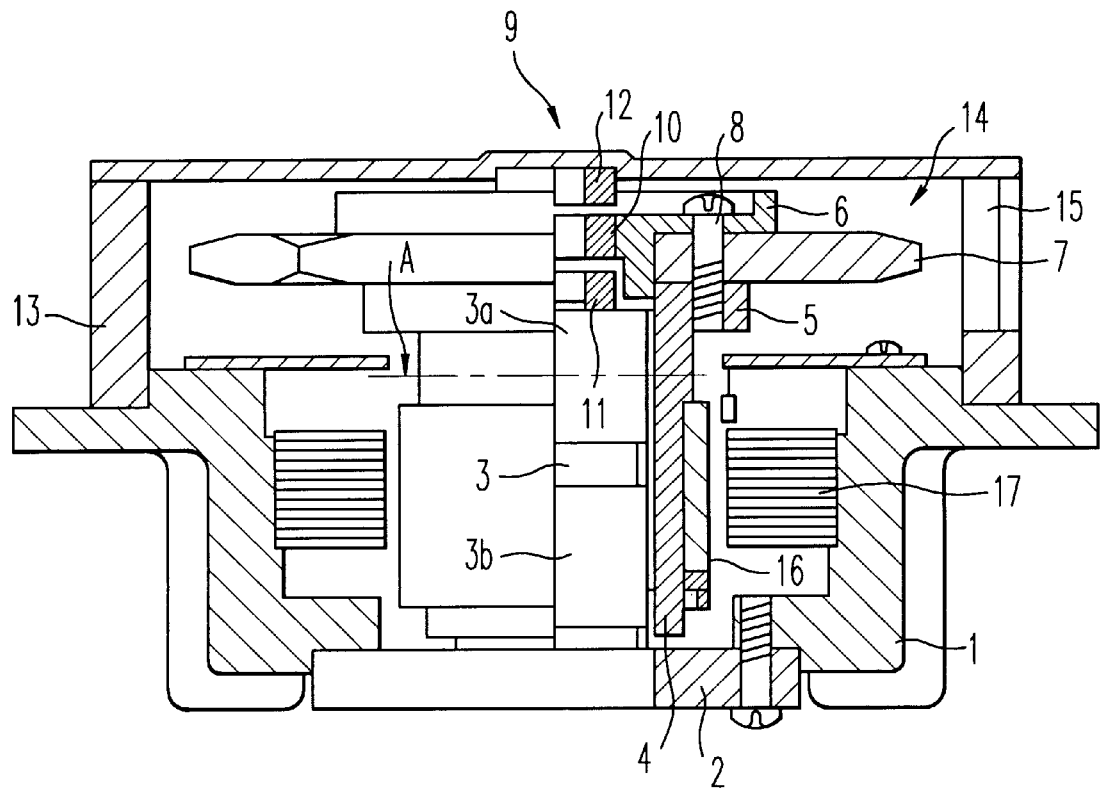
FIG. 1 is a sectional view showing a self-acting air bearing with a fixed shaft of a first embodiment of the present invention.

Referring now to the drawings, wherein like reference numerals designate identical or corresponding parts throughout the several views, embodiments of the present invention will be described.

FIGS. 1 to 7(a), 7(b) show a self-acting air bearing and a process of producing the same of a first embodiment of the present invention.

First, a structure of the present invention will be described. In FIG. 1, numeral 1 designates a motor housing, and a fixed shaft 3 which is a shaft member is coupled and fixed in the vertical direction in the center of a pedestal 2 which constitutes a bottom portion of the housing 1.

Surfaces 3a and 3b of a radial bearing which is a self-acting air bearing are formed in an outer peripheral surface of the fixed shaft 3, and above and below the center portion thereof. The surfaces 3a and 3b of the radial bearing face with an inner peripheral surface of a cylindrical rotating shaft 4 which is a cylinder member with a predetermined spacing and the rotating shaft 4 rotates around the fixed shaft 3.

A flange 5 for supporting a mirror, a mirror holder 6 and a polygon mirror 7 are formed in an upper portion of the rotating shaft 4. The polygon mirror 7 contacts the flange 5 for supporting the mirror of the rotating shaft 4 and the polygon mirror 7 is pressed via the mirror holder 6 by bolts 8. The center portion of the mirror holder 5 holds a magnet 10 which constitutes an axial magnet bearing 9.

The axial bearing 9 includes three magnets 10, 11 and 12 which repel one another. The magnet 12 is installed on an upper case 13 above the magnet 10 and the magnet 11 is fixed on the upper end of the fixed shaft 3. A rotor 14 which includes the rotating shaft 4, the mirror holder 6, the polygon mirror 7 and the magnet 10 is floated above the fixed shaft 3 and is supported without contact. A deflector window 15 is formed in a peripheral portion of the upper case 13 and a laser beam incidents to the polygon mirror 7 through it.

Rotor magnets 16 are installed on an outer peripheral portion of the rotor shaft 4 and driving coils 17 are fixed on an inner peripheral portion of the housing 1 so as to face the magnets 16. Therefore when three phase alternating voltage is applied to the driving coils 17, a rotating magnetic field is generated, and it repels and attracts the magnets 16. Then the rotor 14 rotates together with the magnets 16 and as a result the polygon mirror 7 rotates.

Figure 2:
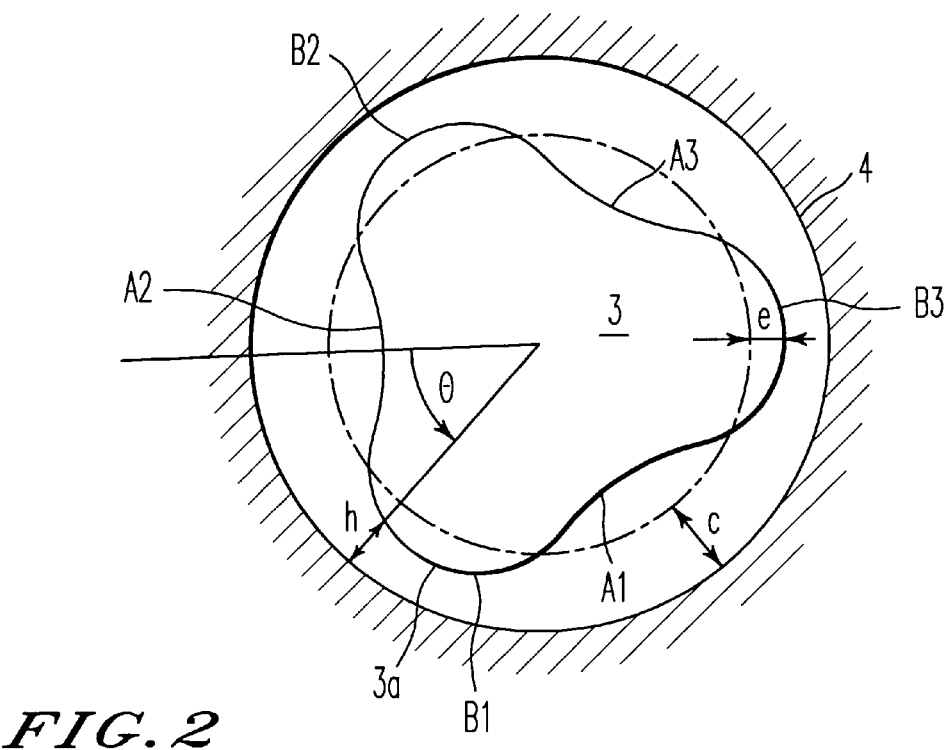
FIG. 2 is a sectional view from direction A shown by an arrow when a rotating shaft is cut by a dashed line in FIG. 1.

On the other hand, as shown in FIG. 2, regular concavities A1 to A3 and convexes B1 to B3 of three cycles are formed in an outline of a section in the radial direction of the rotating shaft 3, which is the bearing surfaces 3a and 3b. One cycle between the concavities A1 to A3 and the convexes B1 to B3 is a harmonic wave.

Next, an operation will be described.

When the three phase alternating voltage is applied to the driving coils 17, the rotating magnetic field is generated, and it repels and attracts the magnets 16. Then the rotor 14 rotates together with the magnets 16 and as a result the polygon mirror 7 rotates.

In this embodiment, when the rotor 14 rotates, bearing rigidity is provided in the radius direction by the compressibility effect of the radial bearing surfaces 3a and 3b between the fixed shaft 3 and the rotating shaft 4.

This point will now be described. As shown in FIG. 2, a bearing spacing h which is a spacing between the radial bearing surfaces 3a and 3b of the fixed shaft 3 and the rotating shaft 4 is as follows approximately when it is not eccentric.

$$h = c + e \cdot \cos(n \cdot \theta) \quad (1)$$

c: is a bearing radius spacing which is approximate 5 μm;

e: is an amplitude of the cycle between the concavity and the convex;

θ: is an angle position of the bearing;

n: is the number of cycles between the concavity and the convex which is two or more.

In this embodiment, n is set to three because from an experimental result the stability of the rotation and the rigidity to the unbalance vibration prove to be best when n is three. However, even if the form of the harmonic wave is provided approximately as indicated in equation (1), the stability of the self-acting air bearing can be improved thereby.

Figure 3:
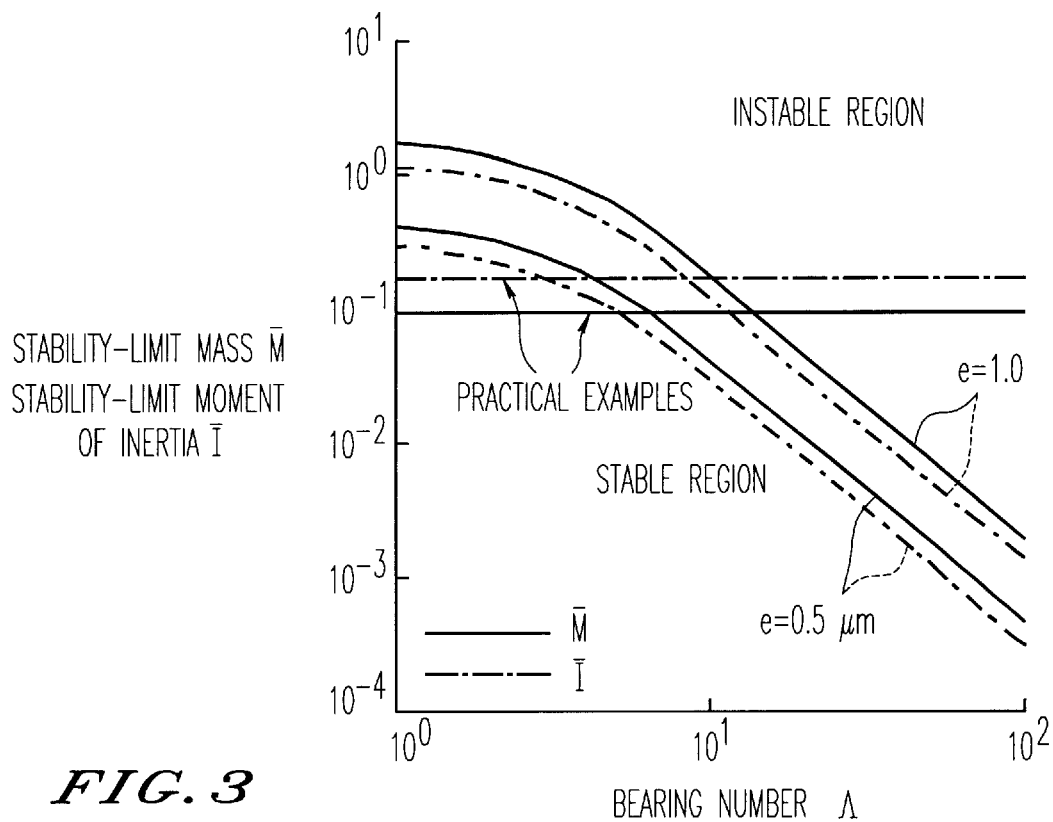
FIG. 3 shows a relationship between number of bearing vs stability-limit mass and stability-limit moment of inertia.

An experimental result for proving the above will be described on the basis of FIGS. 3 to 5 hereinafter. FIG. 3 shows a relationship between bearing number Λ vs stability limit of non-dimensional mass and non-dimensional moment of inertia regarding the rotor 14 when a length in the vertical direction of the bearing divided by a diameter of the bearing is 0.7, n is 3, c is 5 μm, and e is 0.5 μm or 1.0 μm. Design examples of the non-dimensional mass and the non-dimensional moment of inertia are shown as horizontal lines.

As shown in FIG. 3, when e is 1.0 μm, the bearing is stable up to the bearing number Λ of approximate 10 and therefore the rotation is stable up to approximate 40,000 rpm. Further, if the rotor 14 is smaller size and lower weight, it can rotate at higher speed.

Figure 4:
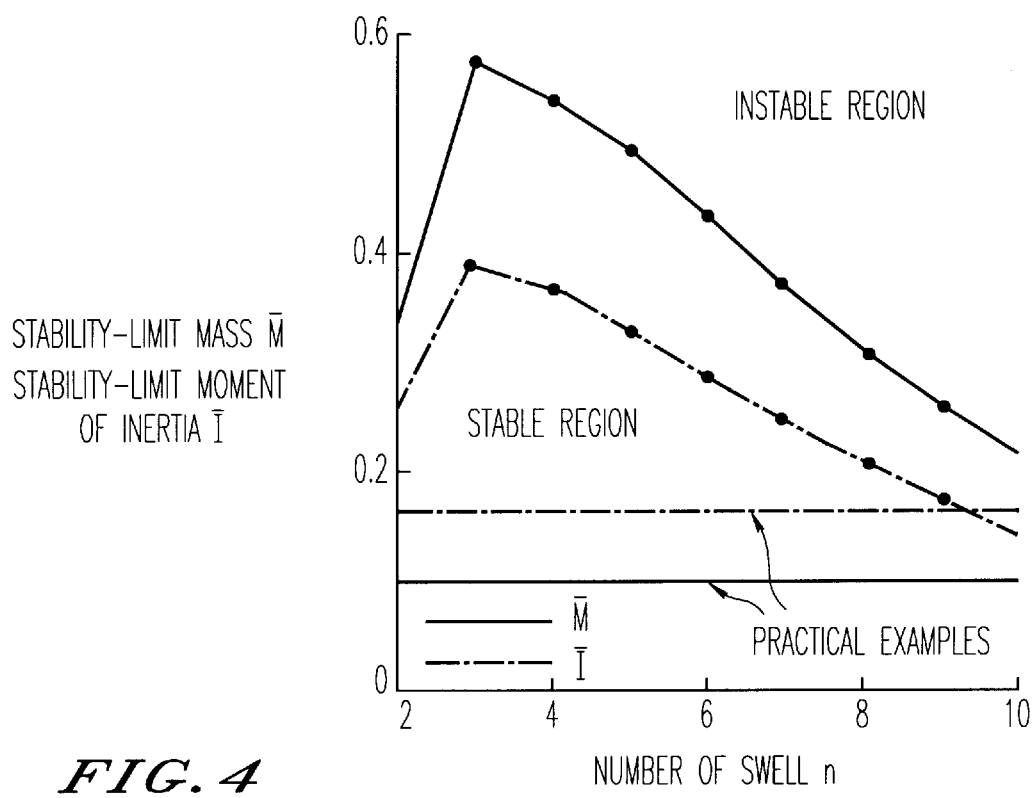
FIG. 4 shows a relation between the number of cycle of swell (which is concavity and convex) vs stability-limit mass and stability-limit moment of inertia.

FIG. 4 shows a relation between number n of cycle of swell which is concavity and convex vs stability-limit mass and stability-limit moment of inertia when Λ is 5 which is approximately 21,500 rpm and e is 1.0 μm.

As shown in FIG. 4, the stability is best when n is 3. Then as n is in order of 3, 4, and 5, it is better. Next it is better when n is 2 or 7.

Figure 5:
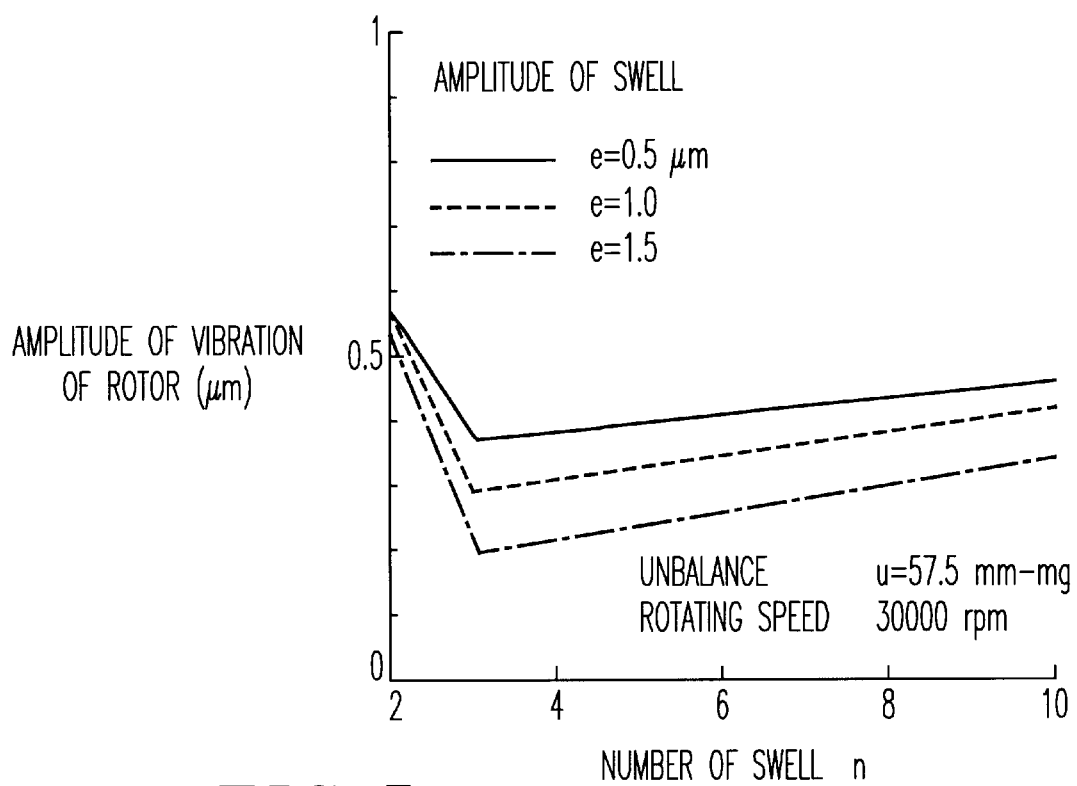
FIG. 5 shows a relationship between the number of cycle of swell (which is concavity and convex) vs amplitude of vibration of a rotor.

FIG. 5 shows a relationship between number of cycle of swell which is concavity and convex vs an amplitude of vibration of a rotor when rotating speed is 30,000 rpm, unbalance is 57.5 mm·mg and e is a parameter. As shown in FIG. 5, when n is 3, the amplitude of vibration is smallest and therefore dynamic rigidity is largest.

From the above result, from the view point of the stability and the unbalance vibration, it is best when n is 3. Further as n is greater, the characteristic is worse. However even if n is 2 or 7, the stability is better than a cylindrical bearing.

Next, the reason why the stability as the self-acting air bearing is increased and the dynamic rigidity to unbalance vibration is improved when the bearing spacing varies in sine curve will be described referring to FIG. 6.

Figure 6:
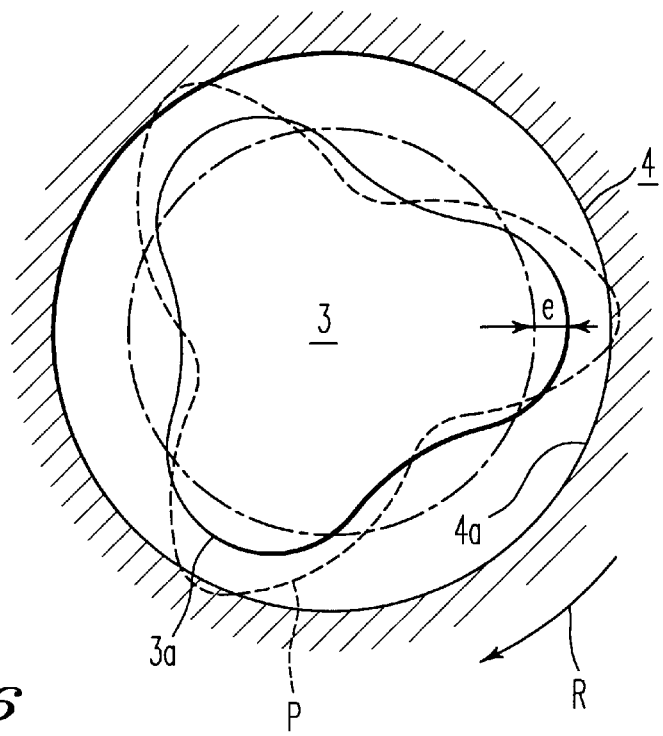
FIG. 6 shows pressure distribution when a rotating shaft rotates in the R direction shown by an arrow.

FIG. 6 shows a pressure distribution P when the inner peripheral surface 4a of the rotating shaft 4 rotates concentrically to the radial bearing surfaces 3a and 3b of the fixed shaft 3 and the bearing number is large.

Even if the inner peripheral surface 4a of the rotating shaft 4 is concentric to the outer peripheral surfaces 3a and 3b of the fixed shaft 3, n pieces of self-acting air bearings of which an eccentric amount is e are formed. Further, in the case of the air bearing, as the bearing number is higher, the pressure at a position of minimum bearing spacing is higher and the pressure at a position of maximum bearing spacing is lower by non-linear effect of the compressibility effect. Therefore even if there is no eccentricity of the bearing, bearing reaction force of which direction is to a center is generated by air film pressure. In addition, when eccentricity is generated, the larger bearing reaction force is generated in a reverse direction to the eccentricity direction. Moreover, as air film pressure is not generated largely in a tangent line direction, which is a cause of instability of the cylindrical bearing, the stability of the self-acting air bearing can be increased and the amplitude of the unbalance vibration can be reduced.

On the other hand, as a liquid bearing such as oil etc. does not have compressibility, positive pressure is generated in narrowing spacing portions and negative pressure is generated in widening spacing portions. Then both pressures are canceled and averaged and therefore the bearing rigidity effect in the radius direction is low. As a result, in the liquid bearing, a multilobe bearing, of which a surface is divided into unsmooth plural surfaces and which generates large eccentricity effectively, is employed.

However, in the multilobe bearing, as effective eccentricity ratio need be high in arc portions, the difference between the minimum spacing and the maximum spacing is large and therefore a small size bearing is difficult to produce. Further as the bearing is divided and is assembled, high accuracy working is not easy.

Next, a process of forming the concavities A1 to A3 and the convexes B1 to B3 of the fixed shaft will be described referring to FIGS. 7(a) and 7(b).

Figure 7A:
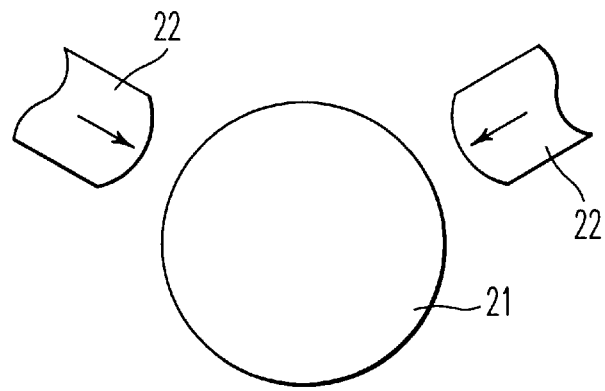
FIG. 7(a) and 7(b) show a process of producing a self-acting air bearing of the first embodiment.
Figure 7B:
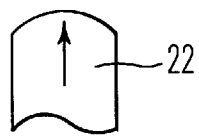
Figure 7B:
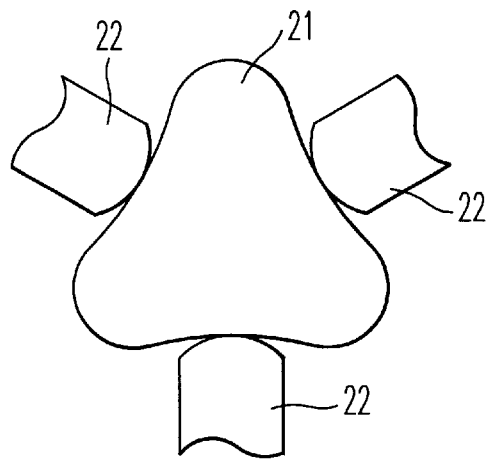

In FIGS. 7(a) and 7(b), numeral 21 designates a base material of the rotating shaft 3 before the concavity and the convex are formed and numeral 22 designates plural pressing members which has a convex surface. The pressing members 22 are set around the base material 21 at the same interval referring to FIG. 7(a) and the base material 21 is pressed from the outside by the pressing members 22 referring to FIG. 7(b). As a result, the concavities A1 to A3 and the convexes B1 to B3 are formed in the base material 21.

When the base material 21 is pressed, an amplitude e of swell which is concavity and convex is increased in proportion to a pressed amount. Practically, the pressed amount, material, and a curve of a tip are design features and are designed appropriately.

As described above, in this embodiment, the concavities A1 to A3 and the convexes B1 to B3 are formed cyclically and regularly in the outline of the fixed shaft 3 and one cycle between one concavity and one convex is a harmonic wave. Therefore the bearing rigidity in the radius direction can be increased by the compressibility effect which is characteristic of the dynamic air film. As a result, a self-acting air bearing with high stability at high speed and high accuracy which has high stability at high speed and low unbalance vibration can be achieved.

When the number n of cycles between the concavity and the convex is 3, the stability of the rotor is best and the rigidity to the unbalance vibration is improved most largely.

When the concavities and the convexes are formed regularly in the fixed shaft 3, plural pressing members 22 having the convex are located at the same interval and press the surface of the base material 21 from plural directions. Therefore the concavities and the convexes are formed in the fixed shaft 3 by a simple structure and a large amount of the fixed shaft 3 can be produced during a short time. As a result, producing cost of the bearing can be decreased.

In this embodiment, though the concavities and the convexes are formed in the outer peripheral surface of the fixed shaft 3, they can be formed in the inner peripheral surface of the rotor shaft 4. In this case, the pressing member is inserted and set in the inner peripheral surface of the rotor shaft 4 and it presses the inner peripheral surface of the rotor shaft 4 to the outside.

In this way, when the concavities and the convexes are formed in either the shaft 3 or the rotor shaft 4, which to select is determined on the basis of productivity. Further the amplitude e of the concavity and the convex is larger as the performance of the bearing is better. However, if the amplitude is one-half or more of the bearing spacing c, the minimum bearing spacing becomes smaller. As a result, stability of abrasion by fine dust etc. becomes lower and therefore a maximum amplitude is set to be desired within a range of enough stability.

In this embodiment, though the concavity and the convex are formed by the pressing member 21, it is not limited. Extrusion molding, in which either the fixed shaft 3 or the rotating shaft 4 is inserted and pressed into a mold in which the concavity and the convex are formed, can be utilized.

Further injection molding, in which resin is injected into a mold in which the concavity and the convex are formed and then the inner peripheral surface of the mold is transferred to the resin, can be utilized. By both the extrusion molding and the injection molding, either the fixed shaft 3 or the rotating shaft 4 can be also produced largely during a short time and its cost can be also decreased.

Figure 8:
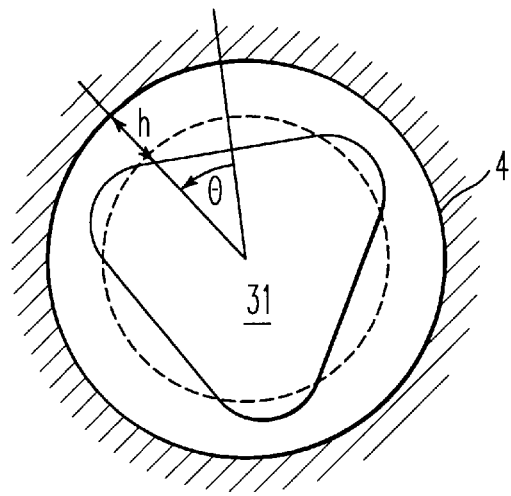
FIG. 8 is a sectional view showing a main part of a self-acting air bearing of a second embodiment of the present invention.

FIG. 8 shows a self-acting bearing of a second embodiment. In this embodiment, the characteristic is that one cycle between one concavity and one convex includes the harmonic wave and high frequencies of small amplitudes. Though the structure of the fixed shaft is different from the first embodiment, the structure of the other elements is the same as the first embodiment, and therefore only the different elements will be described.

In the first embodiment, the form of the inner peripheral surface of the rotating shaft or the outer peripheral surface of the fixed shaft are determined by the equation (1). However, when the concavity and the convex are practically formed in the inner peripheral surface of the rotating shaft or the outer peripheral surface of the fixed shaft, the ideal form is not necessarily formed as indicated by the equation (1).

In this embodiment, the radial bearing of the outer peripheral surface of the fixed shaft 31 is formed as shown in FIG. 8. That is, the concavities and the convexes are formed in the outer peripheral surface of the fixed shaft 31, and one cycle between one concavity and one convex includes the harmonic wave and high frequency waves of small amplitudes. In this case, the bearing spacing h is indicated as follows.

$$h = c + e1 \cdot \cos(n1 \cdot \theta) + e2 \cdot \cos(n2 \cdot \theta) + e3 \cdot \cos(n3 \cdot \theta) + e4 \cdot \cos(n4 \cdot \theta) + \quad (2)$$

Namely, the wave of the concavity and the convex includes not only one harmonic wave, but it also includes plural high frequency components. However, generally, the frequency components except the fundamental wave are much smaller than the fundamental wave. Therefore, this embodiment is almost the same as the first embodiment of the self-acting air bearing.

In this embodiment, this wave can be also formed in the rotating shaft instead of the fixed shaft. In this case, as the wave can be formed by the same process of producing as the first embodiment, the description is omitted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device having a self-acting air bearing, comprising:
   a housing;
   a shaft member vertically fixedly supported in said housing, so as not to rotate within said housing;
   a cylindrical member installed around the shaft member coaxially and rotatably, a rotation of the cylindrical member generating a dynamic air pressure and thereby the cylindrical member is floatingly supported from the shaft member; and
   an axial magnetic bearing means positioned above said shaft member for floatingly supporting said cylindrical member;
   wherein concavities and convexes are formed at a same interval in a peripheral direction in an outer peripheral surface of the shaft member, and a wave of one cycle between a beginning position of one of the concavities and an ending position of one of the convexes is a harmonic wave.

2. A device with the self-acting air bearing according to claim 1, wherein the wave of one cycle between the beginning position of the one of the concavities and the ending position of the one of the convexes includes a harmonic wave and high frequency components of lower amplitude than the harmonic wave.

3. A device with the self-acting air bearing according to claim 1, wherein the number of cycles is two to seven.

4. A device with the self-acting air bearing according to claim 3, wherein the number of cycles is three.

5. A device with the self-acting air bearing according to claim 1, wherein said axial magnetic bearing means comprises a first magnet connected to an upper part of the housing, a second magnet connected to an upper end of the shaft member and a third magnet drivingly connected to the cylindrical member, said third magnet being positioned between said first and second magnets so as to float therebetween.

6. A device with the self-acting air bearing according to claim 1, further comprising a rotor magnet positioned around an outer periphery of said cylindrical member and driving coils positioned on an inner periphery of the housing so as to face said rotor magnet, such that a voltage application to said driving coils creates a rotating magnetic field for rotating said cylindrical member.

7. A device with the self-acting air bearing according to claim 1, wherein said concavities and convexes are positioned at least above and below a center position of either said shaft member or said cylindrical member.

* * * * *